No. 816,396. PATENTED MAR. 27, 1906.
T. G. STEVENS.
BEARING SPRING FOR MOTOR VEHICLES.
APPLICATION FILED DEC. 17, 1904.
2 SHEETS—SHEET 1.
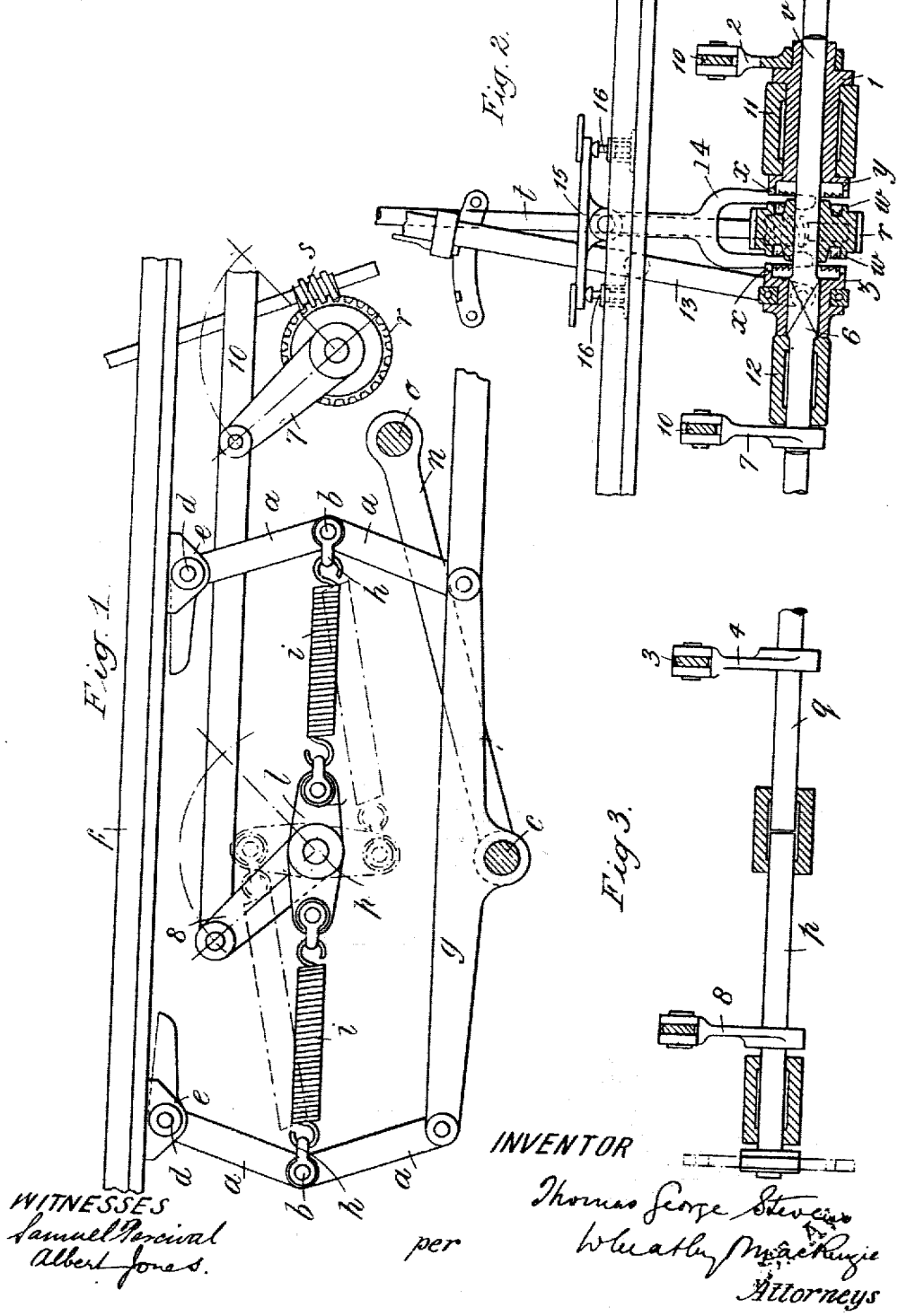
WITNESSES
Samuel Percival
Albert Jones
INVENTOR
Thomas George Stevens
Wheatley MacKenzie
per Attorneys

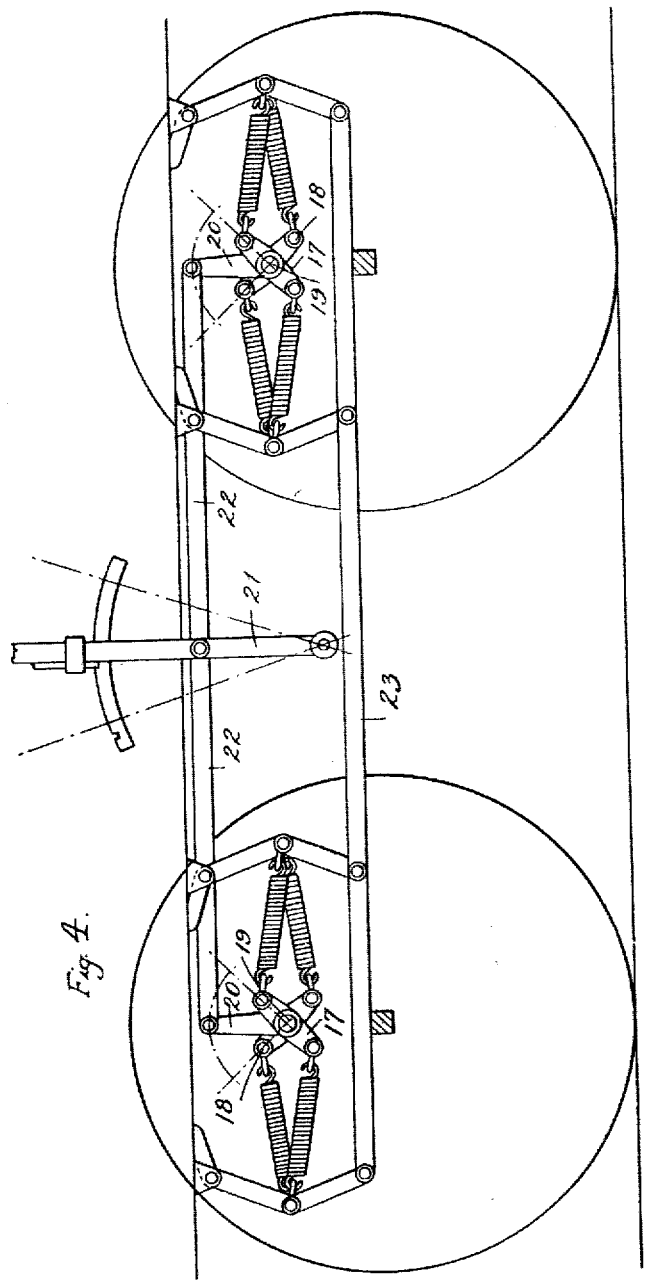

UNITED STATES PATENT OFFICE.

THOMAS G. STEVENS, OF GREENHITHE, ENGLAND.

BEARING-SPRING FOR MOTOR-VEHICLES.

No. 816,396.

Specification of Letters Patent.

Patented March 27, 1906.

Application filed December 17, 1904. Serial No. 237,306.

*To all whom it may concern:*

Be it known that I, THOMAS GEORGE STEVENS, a subject of the King of Great Britain and Ireland, residing at 5 The Terrace, Greenhithe, Kent, England, have invented certain new and useful Improvements in and in Connection with the Bearing-Springs of Motor-Vehicles; and I do hereby declare the following to be a full, clear, and exact description of the invention, such as will enable others skilled in the art to which it appertains to make and use the same.

This invention for improvements in and in connection with the bearing-springs of motor-vehicles has for its object to provide springs of great resilience capable of adjustment to suit the imposed load and which may be caused by means of the method of connection employed to offer when desired an approximately uniform resistance to the applied force; to provide means whereby either or both of a pair of bearing-springs may be strengthened at the will of the driver, so as to resist the tendency of the vehicle to overturn under centrifugal action, as when turning corners at a high speed or to suit the surface of the road, and to provide means for causing any pair of springs to act approximately in unison, and so obviate unpleasant oscillatory motion of the vehicle, while permitting more sensitive springs to be employed than would otherwise be practicable.

In the accompanying illustrative drawings, Figure 1 represents a side elevation of the trailing or driving axle of a motor-vehicle with springs and spring connections constructed according to this invention. Fig. 2 is a transverse sectional elevation of the same, showing the means for controlling the various actions of the said spring mechanism. Fig. 3 is an elevation of a pair of cross-head shafts. Fig. 4 is an elevation of an arrangement by means of which the bearing-springs on one side of a vehicle can be elongated, while those on the opposite side are shortened, while in motion by the driver.

Referring to Figs. 1 to 3, inclusive, of the drawings, each complete bearing-spring comprises two pairs of toggle-levers $a$, pivoted together at $b$ and symmetrically disposed on either side of the vertical plane of the axle $c$, their outer and free ends being pivoted by pins $d$ to brackets or lugs $e$ on the underframe bar $f$ of the vehicle and to a horizontal bar $g$, connected to the axle $c$. To the middle or connecting joint of each pair of the said toggle-links $a$ is connected by the shackle $h$ one end of a helical spring $i$, its other end being connected to a cross-head or double crank $l$, mounted on a central transverse shaft $p$, so that when the said cross-head is rotated the springs are lengthened or shortened, thereby increasing or diminishing their resistance. It will be obvious that any variation of the imposed weight or the force of impact between the wheels and any obstacle on the road will cause the angle between the toggle-levers to diminish, and so elongate the springs $i$, and as the angle between the links $a$ decreases as the length of the spring $i$ increases the resultant resistance at the axle may be made nearly constant. The axle is guided by suitable guide-plates or by means of guide-rods $n$, preferably connected to the wheel-axle $c$ and to the sprocket-wheel-driving shaft $o$, so that the distance between their centers is thereby maintained constant. The cross-heads $l$ are each mounted on separate shafts $p$ $q$, working in separate bearings, for reasons which will be stated farther on. In order to operate the cross-heads actuating the bearing-springs, suitable levers may be mounted on the transverse carrying-shafts, or, preferably, a worm-pinion $r$, operated by a worm $s$ on a suitable hand-spindle $t$, is loosely mounted on the carrying-shaft $v$ and is formed with saw-teeth $w$ on either face, arranged to engage corresponding teeth $x$ in coupling-plates $y$ $z$, also mounted on the same carrying-shaft. One of the said plates $y$ is formed with a sleeve 1, on which is mounted a lever 2, connected by a rod 3 to lever 4, mounted on the cross-head-carrying shaft $q$, and the sleeve is loosely mounted on the carrying-shaft $v$, while the other coupling-plate $z$ slides on the said shaft $v$ on the opposite side of the worm-pinion and is prevented from turning thereon by an ordinary featherkey, square 6, as shown, or other suitable device, a lever 7, mounted on the end of shaft $v$, being connected to a lever 8 on the cross-head-carrying shaft $p$ on the opposite side of the vehicle. Rods 10 connect the levers 2 7 with levers on cross-head-carrying shafts at the front end of the vehicle in a manner similar to that described with reference to the rear end. The shaft $v$ and sleeve 1 work in suitable bearings 11 12, secured to the underframe of the vehicle.

Normally the saw-teeth of the coupling-plates and worm-wheel are held free of each other, the slidable coupling-plate $z$ being held normally in its disengaged position by a hand-lever 13; but when it is desired to operate the springs on either side of the vehicle the worm-wheel saw-teeth are caused by a forked lever 14, operated by a foot-lever 15, to engage the corresponding teeth in the coupling-plate selected, the rotation of the worm and pinion causing the corresponding cross-head to also rotate with it and elongate the springs as desired. When, however, it is desired to strengthen the springs on both sides of the vehicle simultaneously, the sliding coupling-plate z is caused to engage with the worm-pinion r and force it into engagement with the opposite coupling-plate y, so that the worm-pinion and both coupling-plates are locked together, both cross-heads being thus caused to act together. On returning the lever 13 to its normal position the levers 14 and 15 are also returned to their normal positions by the spring-bolts 16, the spring cross-heads and levers 2 7 4 8 being also returned to their normal positions by the bearing-springs, as will be readily understood.

The operating mechanism as hereinbefore described is mounted on a counter-shaft and connected to the spring-cross-head-shafts; but it will be obvious that it may with equal facility be mounted directly on or form part with either the front or rear cross-head shafts, suitable connections being made to enable the driver to manipulate it from the car-seat.

The modified arrangement shown in Fig. 4 is more especially applicable to light vehicles in which the elongation of the bearing-springs can be effected more directly by means of a hand-lever. The spring cross-heads 17 18 in each set of springs for both front and rear axles are mounted on a solid shaft 19 and in planes at right angles to each other, as shown, so that when the cross-head on one end of the shaft lies in a horizontal plane the other is vertical. In the drawings the various parts are shown in normal positions. Two levers 20 are mounted on or integral with the carrying-shafts 19, each being connected to a hand-lever 21 by rods 22, so that on moving the said lever into any position on either side of the mean or normal the springs on one side of the vehicle are lengthened and those on the opposite side correspondingly shortened simultaneously. The axles and toggle-links are connected together on both sides of the vehicle by rods 23, as shown. Obviously the rotation of the cross-head shafts may be effected by means of suitable screw, bevel, or other gearing connected to a shaft on the footboard and operated by the driver.

What I claim, and desire to secure by Letters Patent, is—

1. In a motor-car, a spring supporting-frame interposed between the car-body and axle, comprising toggle levers or links connected to the car-frame and to the axle, helical springs connected at their outer ends to the central pivots or middle joints of the toggles, and means connected with the inner ends of the springs to elongate the springs on either side of the vehicle separately, substantially as described.

2. In a motor-car, a spring supporting-frame interposed between the car-body and axle, comprising toggle levers or links connected to the car-frame and to the axle, helical springs connected at their outer ends to the central pivots or middle joints of the toggles, a rotatable cross-head connected to the inner ends of the springs, and means for operating said cross-head to elongate or contract the springs, substantially as described.

3. In a motor-car, a spring supporting-frame interposed between the car-body and axle, comprising toggle levers or links connected to the car-frame and to the axle, helical springs connected at their outer ends to the central pivots or middle joints of the toggles, a rotatable cross-head connected to the inner ends of the springs, a transverse carrying-shaft, a pinion loosely mounted on the shaft, and provided with clutch-teeth on both faces, loose sleeves having similar teeth mounted on the same shaft on either side of the pinion and connected to the bearing-spring cross-heads on opposite sides of the vehicle, an operating worm-spindle geared with said pinion, and means for engaging and disengaging the coupling-sleeves and pinion, substantially as described.

In testimony whereof I have affixed my signature in presence of two witnesses.

THOMAS G. STEVENS.

Witnesses:
ALBERT JONES,
HERBERT C. BOLWELL.